US007764834B2

(12) United States Patent
Simard, III et al.

(10) Patent No.: US 7,764,834 B2
(45) **Date of Patent: *Jul. 27, 2010**

(54) SYSTEM AND METHOD FACILITATING DOCUMENT IMAGE COMPRESSION UTILIZING A MASK

(75) Inventors: Patrice Y. Simard, III, Bellevue, WA (US); Erin L. Renshaw, Kirkland, WA (US); James Russell Rinker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 11/465,083

(22) Filed: Aug. 16, 2006

(65) Prior Publication Data

US 2006/0274381 A1 Dec. 7, 2006

Related U.S. Application Data

(63) Continuation of application No. 10/180,771, filed on Jun. 26, 2002, now Pat. No. 7,110,596, which is a continuation-in-part of application No. 10/133,842, filed on Apr. 25, 2002, now Pat. No. 7,263,227, and a continuation-in-part of application No. 10/133,558, filed on Apr. 25, 2002, now Pat. No. 7,164,797, and a continuation-in-part of application No. 10/133,939, filed on Apr. 25, 2002, now Pat. No. 7,392,472.

(51) Int. Cl.
*G06K 9/00* (2006.01)

(52) U.S. Cl. ....................... 382/166; 382/232; 382/243; 358/426.01

(58) Field of Classification Search ......... 382/232–253, 382/162, 166; 358/426.01–426.16
See application file for complete search history.

(56) References Cited

U.S. PATENT DOCUMENTS

| | | | |
|---|---|---|---|
| 3,606,546 | A | 9/1971 | Dudley et al. |
| 3,719,922 | A | 3/1973 | Lopes, Jr. et al. |
| 3,882,454 | A | 5/1975 | Marie et al. |
| 4,606,069 | A | 8/1986 | Johnson et al. |

(Continued)

FOREIGN PATENT DOCUMENTS

EP 0 567 344 A2 10/1993

(Continued)

OTHER PUBLICATIONS

Kazuaki Nakamura, "Document Image Segmentation Using Neural Networks, The Journal of the Institute of Image Electronics Engineers of Japan", Japan, Institute of Image Electronics Engineers, Apr. 25, 1999, vol. 28, No. 2, pp. 106 to 115.

(Continued)

*Primary Examiner*—Aaron W Carter
(74) *Attorney, Agent, or Firm*—Lee & Hayes, PLLC

(57) ABSTRACT

A system and method facilitating document image compression utilizing a mask separating a foreground of a document image from a background is provided. The invention includes a pixel energy analyzer adapted to partition regions into a foreground and background. The invention further provides for a merge region component adapted to attempt to merge regions if the merged region would not exceed a threshold energy. Merged regions are partitioned into a new foreground and new background. Thereafter, a mask storage component stores the partitioning information in a binary mask.

19 Claims, 11 Drawing Sheets

U.S. PATENT DOCUMENTS 4,747,156 A 5/1988 Wahl
4,754,492 A 6/1988 Malvar
4,922,545 A 5/1990 Endoh et al.
4,924,494 A 5/1990 Shung
5,077,807 A 12/1991 Bokser
5,129,014 A 7/1992 Bloomberg
5,304,991 A 4/1994 Motegi
5,402,146 A 3/1995 Rodriguez et al.
5,434,953 A 7/1995 Bloomberg
5,454,047 A 9/1995 Chang et al.
5,572,565 A 11/1996 Abdel-Mottaleb
5,572,604 A 11/1996 Simard
5,592,568 A 1/1997 Wilcox et al.
5,610,996 A 3/1997 Eller
5,689,585 A 11/1997 Bloomberg et al.
5,710,830 A * 1/1998 Holeva ....................... 382/173
5,737,455 A 4/1998 Harrington et al.
5,754,183 A 5/1998 Berend et al.
5,778,092 A 7/1998 MacLeod et al.
5,790,696 A 8/1998 Takashi
5,805,727 A 9/1998 Nakano
5,805,739 A 9/1998 Malvar et al.
5,828,771 A 10/1998 Bloomberg
5,883,986 A 3/1999 Kopec et al.
5,910,805 A 6/1999 Hickey et al.
5,914,748 A 6/1999 Parulski et al.
5,915,044 A 6/1999 Gardos et al.
5,917,951 A 6/1999 Thompson et al.
5,917,964 A 6/1999 Normile
5,923,380 A 7/1999 Yang et al.
5,930,377 A 7/1999 Powell et al.
5,960,111 A 9/1999 Chen et al.
5,960,119 A 9/1999 Echigo et al.
5,991,515 A 11/1999 Fall et al.
6,000,124 A 12/1999 Saito et al.
6,020,972 A 2/2000 Mahoney et al.
6,029,126 A 2/2000 Malvar
6,058,362 A 5/2000 Malvar
6,064,762 A 5/2000 Haenel
6,069,636 A 5/2000 Sayuda et al.
6,072,496 A 6/2000 Guenter et al.
6,073,153 A 6/2000 Malvar
6,094,506 A 7/2000 Hullender
6,100,825 A 8/2000 Sedluk et al.
6,108,444 A 8/2000 Syeda-Mahmood
6,108,446 A 8/2000 Hoshen
6,115,689 A 9/2000 Malvar
6,118,890 A 9/2000 Senior
6,137,908 A 10/2000 Rhee
6,144,767 A 11/2000 Bottou et al.
6,151,424 A 11/2000 Hsu
6,154,762 A 11/2000 Malvar
6,182,034 B1 1/2001 Malvar
6,192,360 B1 2/2001 Dumais et al.
6,233,364 B1 5/2001 Krainiouk et al.
6,240,380 B1 5/2001 Malvar
6,253,165 B1 6/2001 Malvar
6,256,608 B1 7/2001 Malvar
6,272,253 B1 8/2001 Bannon et al.
6,285,801 B1 9/2001 Mancuso et al.
6,309,424 B1 10/2001 Fallon
6,310,972 B1 10/2001 Li et al.
6,321,243 B1 11/2001 Ballard
6,324,560 B1 11/2001 Malvar
6,326,977 B1 12/2001 Westerman
6,334,001 B2 12/2001 de Queiroz et al.
6,345,119 B1 2/2002 Hotta et al.
6,564,263 B1 5/2003 Bergman et al.
6,633,670 B1 10/2003 Matthews
6,731,800 B1 5/2004 Barthel et al.
6,738,079 B1 5/2004 Kellerman et al.
6,819,796 B2 11/2004 Hong et al.
6,826,727 B1 11/2004 Mohr et al.
6,907,141 B1 6/2005 Okamoto
6,977,664 B1 12/2005 Jinzenji et al.
7,024,039 B2 4/2006 Simard et al.
7,110,596 B2 * 9/2006 Simard et al. ............... 382/166
2001/0004618 A1 6/2001 Hur
2002/0064313 A1 5/2002 Cheng
2003/0123729 A1 7/2003 Mukherjee et al.
2003/0229856 A1 12/2003 Lynn et al.

FOREIGN PATENT DOCUMENTS

EP 0 621 554 A2 10/1994
EP 0802680 10/1997
EP 0853421 7/1998
EP 1006714 A2 6/2000
EP 1104916 6/2001
EP 1006714 A3 9/2001
EP 1146478 A2 10/2001
GB 2181875 4/1987
GB 2 230 633 A 10/1990
JP 60254871 12/1985
JP 63269267 11/1988
JP 2277183 11/1990
JP 03018986 1/1991
JP 04264687 9/1992
JP 668301 3/1994
JP 06231307 8/1994
JP 08101893 4/1996
JP 10262155 9/1998
JP 2000013596 1/2000
JP 2001266158 9/2001
JP 2002118843 4/2002

OTHER PUBLICATIONS

Patrick Haffner, et al. "DjVu: Analyzing and Compressing Scanned Documents for Internet Distribution", AT&T Labs-Research; pp. 1-4.

Felix Balado Pumarino, et al. "A Two-Stage Codebook Building Method Using Fast WAN"; University of Vigo, Communications Technology Department.

Henrique S. Malvar "Fast Progressive Wavelet Coding"; Microsoft Research.

Patrice Y. Simard, et al. "A Wavelet Coder for Masked Images"; Proceedings of the Data Compression Conference (DCC'01); Microsoft Research.

Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.

Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al. "Browsing through high quality document images with DjVu" Research and Technology Advances in Digital Libraries. ADL 1998 Proceedings (Apr. 22, 1998) IEEE International Forum in Santa Barabra, California, pp. 309-318.

Simard, et al. "A Forefround/Background Separation Algorith for Image Compression" (Mar. 23, 2004) Data Compression Conference, Snowbird, Utah, pp. 498-507.

European Search Report dated Oct. 4, 2005 mailed Oct. 13, 2005 for EPApplications Serial No. 03005430, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 for EP Application Serial No. 03/005,431, 5 pages.

Debargha Mukherjee, et al. "JPEG2000-Matched MRC Compression of Compound Documents"; Jun. 6, 2002.
Rangachar Kasturi, et al. "Document Image Analysis: A Primer"; Sadhana vol. 27, Part 1, Feb. 2002, pp. 3-22.
Qian Huang, et al. "Foreground/Background Segmentation of Color Images by Integration of Multiple Cues" Proceedings of the '95 Int'l. Conf. on Image Processing (ICIP).
Guotong Fengm et al. "High Quality MRC Document Coding"; School of Electrical and Computer Engineering; Purdue University; Sarnoff Corporation.
Ping Wah Wong; Halftoning by Multiscale Dot Distribution; Proceedings of the '95 Int'l. Conf. on Image Processing (ICIP '95); pp. 117-120.
Yann LeCun, et al. "Learning Algorithms for Classification: A Comparison on Handwritten Digit Recognition"; AT&T Bell Laboratories.
Patrice Y. Simard, et al. "Boxlets: A Fast Convolution Algorithm for Signal Processing and Neural Networks"; AT&T Labs-Research.
Trevor Hastie, et al. "Metrics and Models for Handwritten Character Recognition"; Dec. 8, 1997; pp. 1-18.
Leon Bottou, et al. "High Quality Document Image Compression with DjVu"; Jul. 13, 1998; AT&T Labs.
Patrick Haffner, et al. "Color Documents on the Web with DjVu"; AT&T Labs-Research.
Yiu-fai Wong, et al. "Reprocessing of Video Signals for MPEG Coding by Clustering Filter"; Proceedings of the '95 Int'l Conf. on Image Processing (ICIP '95); pp. 129-132.
European Search Report dated Sep. 15, 2005, for European Patent Application Serial No. EP 03 00 5429, 4 pages.
Witten, Ian H., et al. "Textual Image Compression", Data Compression Conference, IEEE, 10 pages, Mar. 24, 1992.
European Search Report dated Nov. 21, 2005, mailed Nov. 30, 2005, for European Patent Application Serial No. EP 03 00 6769, 3 Pages.

* cited by examiner

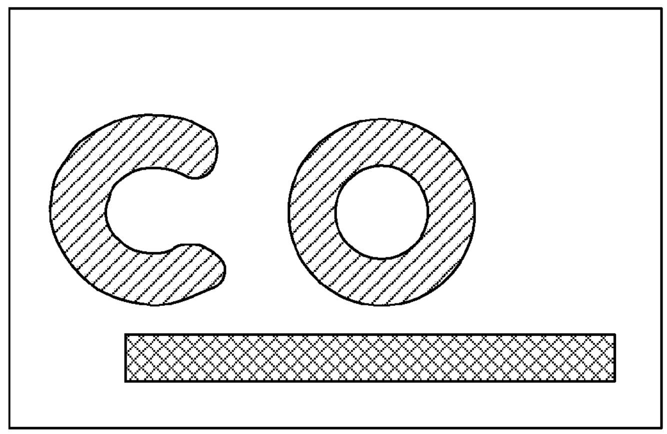
ORIGINAL
FIG. 2
BINARY MASK
FIG. 3
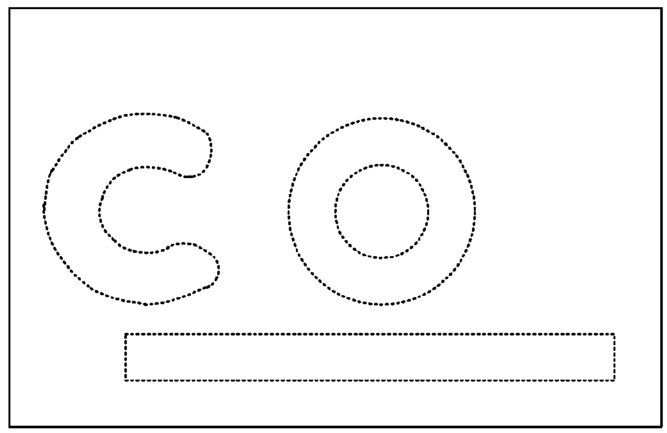
BACKGROUND
FIG. 4

| $V_1$ | $V_2$ |
|---|---|
| $V_3$ | $V_4$ |

FIG. 5

| $F_1$ | $B_1$ | $F_2$ | $B_2$ |
|---|---|---|---|
| $B_1$ | $F_1$ | $F_2$ | $B_2$ |

FIG. 6

| $F_1, B_1$ | $F_2, B_2$ |
|---|---|
| $F_3, B_3$ | $F_4, B_4$ |

FIG. 7

1410
1412
PROCESSING UNIT
1414
SYSTEM MEMORY
1416
1418
1422
RAM
1420
ROM
BUS
1434
INTERFACE
HARD DRIVE
1424
1426
1436
INTERFACE
FLOPPY DRIVE
1428
DISK
1430
1432
1438
INTERFACE
CD-ROM DRIVE
DISK
VIDEO ADAPTOR
1456
1452
SERIAL PORT INTERFACE
MODEM
1468
NETWORK ADAPTOR
1466
1440
OPERATING SYSTEM
1442
APPLICATIONS
1444
MODULES
1446
DATA
1454
MONITOR
1448
KEYBOARD
1450
MOUSE
WAN
1464
LAN
1462
REMOTE COMPUTER(S)
MEMORY STORAGE
1458
1460

SYSTEM AND METHOD FACILITATING DOCUMENT IMAGE COMPRESSION UTILIZING A MASK

CROSS-REFERENCE TO RELATED APPLICATIONS

This application is a Continuation of U.S. patent application Ser. No. 10/180,771, filed Jun. 26, 2002, now U.S. Pat. No. 7,110,596 entitled, "SYSTEM AND METHOD FACILITATING DOCUMENT IMAGE COMPRESSION UTILIZING A MASK", which is a Continuation-in-Part of U.S. patent application Ser. No. 10/133,842, filed Apr. 25, 2002, now U.S. Pat. No. 7,263,227 entitled, "ACTIVITY DETECTOR", U.S. patent application Ser. No. 10/133,558, filed Apr. 25, 2002, now U.S. Pat. No. 7,164,797 entitled, "CLUSTERING", and U.S. patent application Ser. No. 10/133,939, filed Apr. 25, 2002, now U.S. Pat. No. 7,392,472 entitled, "LAYOUT ANALYSIS". The entireties of the aforementioned applications are incorporated herein by reference. This application is also related to U.S. application Ser. No. 10/180,169, filed Jun. 26, 2002, entitled, "SEGMENTED LAYERED IMAGE SYSTEM", U.S. patent application Ser. No. 11/465,087, filed Aug. 16, 2006, entitled, "SEGMENTED LAYERED IMAGE SYSTEM", U.S. patent application Ser. No. 10/180,649, filed Jun. 26, 2002, entitled "BLOCK RETOUCHING", U.S. patent application Ser. No. 10/180,800, filed Jun. 26, 2002, entitled "DON'T CARE" PIXEL INTERPOLATION", U.S. patent application Ser. No. 11/286,622, filed Nov. 23, 2005, entitled, "LAYOUT ANALYSIS", and U.S. patent application Ser. No. 11/198,562, filed Aug. 5, 2005, entitled, "CLUSTERING." The entireties of the aforementioned applications are incorporated herein by reference.

TECHNICAL FIELD

The present invention relates generally to document image processing, and more particularly to a system and method facilitating document image compression utilizing a mask partitioning a foreground of a document image from a background.

BACKGROUND OF THE INVENTION

The amount of information available via computers has dramatically increased with the wide spread proliferation of computer networks, the Internet and digital storage means. With the increased amount of information has come the need to transmit information quickly and to efficiently store the information. Data compression is one manner in which document(s) can more effectively be transmitted and/or stored.

Conventional data compression systems have utilized various compression approaches, for example, symbol matching. However, typical compression approaches that work effectively for documents having image(s) do not work well, for example, for documents have text and/or handwriting.

Data compression reduces the space necessary to represent information. Compression can be used for any type of information. However, compression of digital information, including images, text, audio, and video is becoming more important. Typically, data compression is used with standard computer systems. However, other technologies make use of data compression, such as but not limited to digital and satellite television as well as cellular/digital phones.

Data compression is important for several reasons. Data compression allows information to be stored in less space than uncompressed data. As the demand for large amounts of information increases, data compression may be required to supply the large amounts of information. The size of storage devices has increased significantly, however the demand for information has outstripped these size increases. For example, an uncompressed image can take up 5 megabytes of space whereas the same image can be compressed and take up only 2.5 megabytes of space. Additionally, data compression permits transferring of larger amounts of compressed information than uncompressed information. Even with the increase of transmission rates, such as broadband, DSL, cable modem Internet and the like, transmission limits are easily reached with uncompressed information. For example, transmission of an uncompressed image over a DSL line can take ten minutes. However, with data compression, the same image can be transmitted in about a minute.

In general, there are two types of compression, lossless and lossy. Lossless compression allows the exact original data to be recovered after compression, while lossy compression allows the original data to differ from the uncompressed data. Lossy compression allows for a better compression ratio because it can eliminate data from the original. Lossless compression may be used, for example, when compressing critical text, because failure to exactly reconstruct the data can seriously affect the quality and readability of text. Lossy compression can be used with images or non-critical text where a certain amount of distortion or noise is either acceptable or imperceptible by our limited senses.

Data compression is especially applicable to digital documents. Digital documents or digital document images are digital representations of documents. Typically, digital documents include text, images and/or text and images. In addition to using less storage space for current digital data, compact storage without significant degradation of quality would encourage the digitization of current hardcopies making paperless offices more feasible. Striving toward such paperless offices is an important goal for business to have, because paperless offices provide many benefits, such as allowing easy access to information, reducing environmental costs, reducing storage costs and the like. Furthermore, decreasing file sizes of digital documents through compression allows more efficient use of Internet bandwidth, thus allowing for faster transmission of more information and a reduction of network congestion. Reducing required storage for information, movement toward efficient paperless offices, and increasing Internet bandwidth efficiency are just some of the many significant benefits of compression technology.

Data compression of digital documents has a number of goals to make the use of digital documents more attractive. First, data compression should be able to compress and decompress large amounts of information in a small amount of time. Secondly, data compression should be able to accurately reproduce the digital document.

Additionally, data compression of digital documents should make use of the purpose of a document. Some digital documents are used for filing or providing hard copies. Other documents may be revised and/or edited. Current data compression fails to handle reflowing of text and/or images when viewed, and fails to provide efficient and effective means to enable compression technology to recognized characters and reflow them to word processors, personal digital assistants (PDAs), cellular phones, and the like. Therefore, if hard copy office documents are scanned into digital form, current compression technology can make it difficult if not impossible to update, amend, or in general change the digitized document.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to a system and method facilitating document image compression utilizing a mask partitioning a foreground of a document image from a background. In accordance with an aspect of the present invention, a mask separator component receives a document image (e.g., binary, RGB and/or YUV representation of document(s)) as an input. The mask separator component processes the document image and outputs a mask (e.g., binary) indicating whether each pixel of the document image belongs in the foreground and/or background. By separating the foreground (e.g., textual information) from the background (e.g., graphical information), the foreground and/or the background can be more effectively compressed, thus decreasing file size and/or transmission time. The mask and/or the document image can then be processed by other part(s) of a compression system (e.g., in order to achieve improved compression of the document image). For example, the system and/or method of the present invention can be utilized in an overall segmented layered image system facilitating identification and/or compression of text, handwriting, drawings and the like.

In accordance with one particular aspect of the invention, the mask separator component includes a pixel energy component, a region merge component and a mask storage component. The pixel energy component is adapted to calculate pixel energy (e.g., variances) for region(s) of a document image in order to minimize energy variance(s) of the foreground and/or background. The energy (e.g., energy measure based on a sum of the square of distances) is used as an estimate of the compression that would be obtained for the foreground and/or the background. However, in order to simplify computational overhead, the document image can be partitioned into regions (e.g., two pixel by two pixel) and a foreground and background determined for each region (e.g., based at least in part upon minimization of energy variance(s) in the background and/or foreground). In other words, each region is itself partitioned into two sets: the pixels belonging to the foreground, and the pixels belong to the background. In order to further minimize computational overhead, the pixel energy component can, at least temporarily, store calculation information for use by the merge region component and/or the mask storage component.

The region merge component is adapted to attempt to merge pairs of regions of the document image based, at least in part, upon a determination of whether energies of a new foreground and/or a new background of the potential merged regions are less than a first threshold energy. The region merge component can utilize calculation information stored by the pixel energy component. The result of a merge is a larger region which will be characterized by its own foreground and background partition. Pixel(s) that were foreground prior to the merge can end up in the background of the merged region and vice versa. The region merge component can determine a suitable foreground/background partition of the merged region, for example, based at least in part upon minimization of new background and new foreground energies.

The region merge component can continue to attempt to merge successively larger regions until the threshold energy would be exceeded and/or substantially all of the document image has been merged. For example, the region merge component can merge horizontally adjoining two by two regions into a two by four region. Thereafter, the region merge component can vertically merge regions into a four by four region. Generally, the first threshold energy value can be selected to mitigate potential situation(s) in which attempted merge(s) would partition several gray levels into the foreground or into the background, with a potential loss of important detail(s), such as text (e.g., when there are more than two colors in a region). Thus, a mask capturing most of the text and/or graphic line(s) associated with a document image can be captured.

Once merging has been completed for a region, the partition of foreground background for this region constitute the mask, for example, the pixel(s) belonging to the foreground can be assigned a “1” in the mask, while the pixel(s) belonging to the background can be assigned “0”. Unfortunately, keeping track of the foreground and background partitions during the merge operation can be computationally expensive. An alternative (e.g., more computationally effective) is to calculate an average of substantially all of the pixels of the merged region and assign pixel(s) having a gray level value greater than the average to the foreground with the remaining pixel(s) being assigned to the background. Alternatively, pixel(s) having a gray level value greater than the average can be assigned to the background with the remaining pixel(s) being assigned to the foreground. The two alternatives can yield visually indiscernible masks.

Thereafter, the mask storage component is adapted to store information associated with partitioning of the foreground and the background in the mask. Thus, the mask indicates whether each pixel of the document image belongs in the foreground and/or background.

In accordance with another aspect of the present invention, in order to minimize computational overhead, energy for a small region (e.g., four pixel by four pixel) can be calculated by the pixel energy component. If the energy is less than a second threshold energy, substantially all of the pixels can be assigned to the foreground or the background with the other being substantially empty. If the energy is greater to or equal to the second threshold energy, partitioning can proceed as described previously. For relatively clean document image(s) (e.g., having constant area(s)), a significant increase in computational speed can be achieved.

In accordance with another aspect of the present invention, in order to minimize the size of the mask, if a final region (e.g., a region that cannot be merged without exceeding the first threshold), has a difference between the average foreground and the average background that is higher than a third threshold, the whole region is declared foreground or declared background, depending on whether a global average for the region is more or less than the middle gray level value (e.g., 127 if the gray level values are between 0 and 255). For color document that have a slight dithering, the mask for these region would look like salt and pepper without this optimization and would have high compression cost. The third threshold is chosen so as to not lose important text, and yet remove the many cases of slight dithering seen in scanning printed document (e.g., many printers have only 4 to 6 colors and must use dithering to generate the full palette of colors). In one example, a value of 40 is a good choice for the third threshold.

Yet another aspect of the present invention provides for the pixel energy component to utilize a polynomial regression in order to describe the foreground and/or the background.

Another aspect of the present invention provides for a document image separation system having a mask separator component and a foreground/background segmenter. The mask separator component can process a document image (e.g., comprising text and/or handwriting) and store information regarding which pixels are in the foreground and which are in the background in a mask. Thereafter, the foreground/background segmenter can receive the mask and the document image and separate the document image into a foreground image and a background image.

In accordance with yet another aspect of the present invention, a document image compression system having a document image transformation component, a mask separation component and a foreground/background separation component is provided. Optionally, the document image compression system can include a mask encoder, a foreground encoder and/or a background encoder.

Yet another aspect of the present invention provides for a segmented layered image system having a pixel energy component and a mask storage component. The segmented layered image system can be employed in a vast array of document image applications, including, but not limited to, photocopiers, document scanners, optical character recognition systems, personal digital assistants, fax machines, digital cameras, digital video cameras and/or video game systems.

Other aspects of the present invention provide methods methodologies for generating a mask, a computer readable medium having computer usable instructions for a mask separation component and a data packet adapted to be transmitted between two or more computer processes comprising information associated with a mask, the mask assigning pixels to at least one of a foreground and a background of a document image, the mask being based at least in part upon calculation of minimization of energy of pixels in a region of the document image.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 is an exemplary document image in accordance with an aspect of the present invention.

FIG. 3 is a mask associated with the exemplary document image of FIG. 2 in accordance with an aspect of the present invention.

FIG. 4 is a background associated with the exemplary document image of FIG. 2 and the mask of FIG. 3 in accordance with an aspect of the present invention.

FIG. 5 is an exemplary two pixel by two pixel region of a document image in accordance with an aspect of the present invention.

FIG. 6 is an exemplary two pixel by four pixel potential merged region in accordance with an aspect of the present invention.

FIG. 7 is an exemplary four pixel by four pixel potential merged region in accordance with an aspect of the present invention.

DETAILED DESCRIPTION OF THE INVENTION

Figure 1:
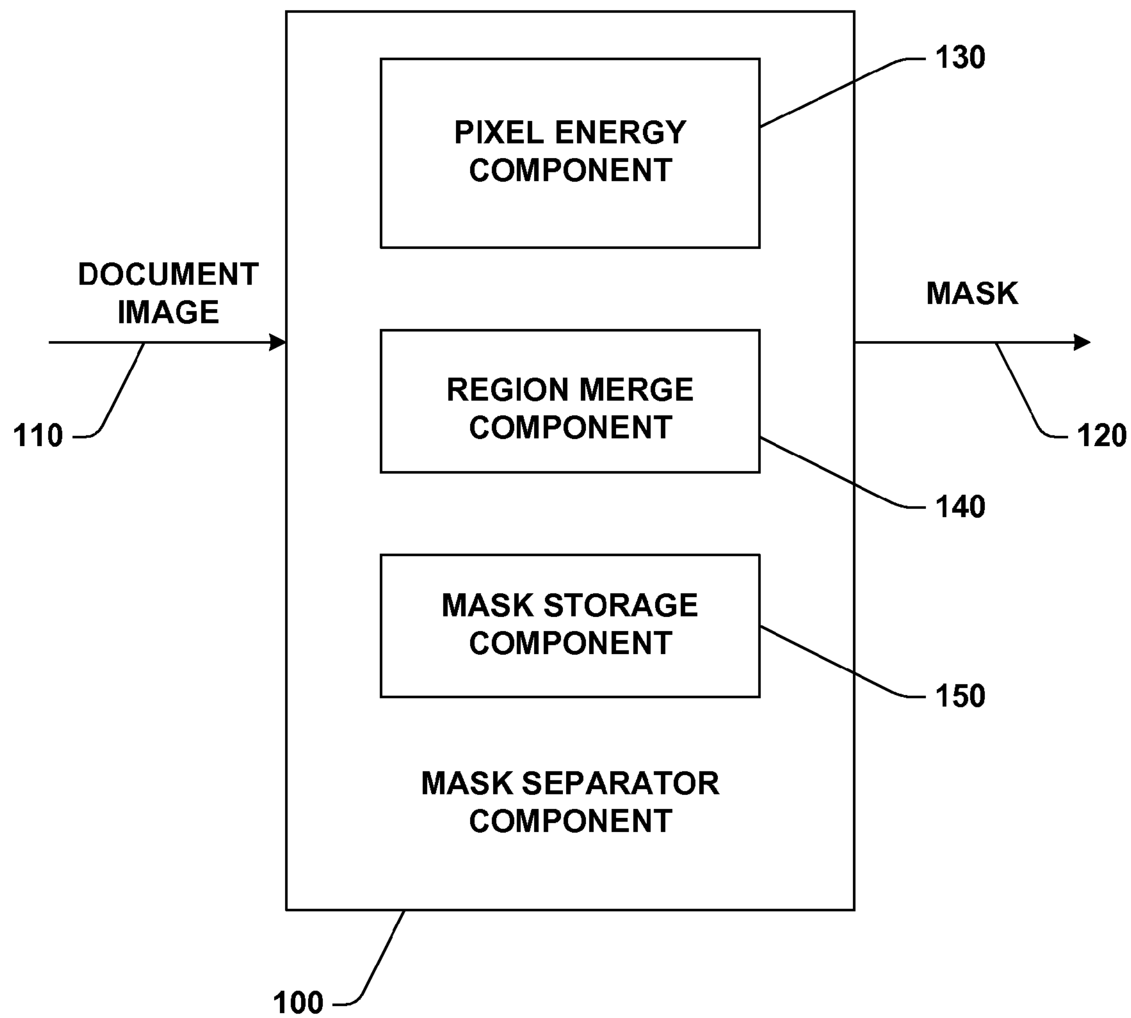
FIG. 1 is block diagram of a mask separator component in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms “component” and “system” are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Further, “document image” is intended to refer to a digital representation of document(s) comprising one or more color(s) (e.g., binary (e.g., black/white), gray-scale and/or color document(s)). Additionally, a document image can have image(s), text and/or text with images, with potential superimposition of text and images. A document image can be binary, RGB and/or YUV representations of document(s). An RGB document image is represented red, green and blue components. A YUV document image is represented using a luminescence component denoted by Y and chrominance components denoted by U and V. Less bits can be used to represent the chrominance components U and V without significantly sacrificing visual quality of the YUV image. The YUV representation is, generally, a more compact and easy to use representation than an RGB representation. A document image comprises picture elements commonly referred to as "pixels". A document image can be based on single or multi-page document(s) of any shape or size.

Referring to FIG. 1, a mask separator component 100 in accordance with an aspect of the present invention is illustrated. The mask separator component 100 receives a document image 110 (e.g., based on a document to be archived and/or transmitted). For example, the mask separator component 100 can be part of a document compression system (not shown). The document image 110 can be a binary, RGB and/or YUV representation of document(s). The mask separator component 100 processes the document image 110 and outputs a mask 120 (e.g., binary) indicating whether each pixel of the document image 110 belongs in the foreground and/or background. The mask 120 and/or the document image 110 can then be processed by other part(s) of the compression system (not shown) in order to effect compression of the document image 110.

Turning briefly to FIG. 2, an exemplary document image is illustrated. The document image comprises the letters "C" and "O" along with a bar. FIG. 3 illustrates a mask associated with the exemplary document image of FIG. 2 in accordance with an aspect of the present invention. FIG. 4 illustrates a background associated with the exemplary document image of FIG. 2 and the mask of FIG. 3 in accordance with an aspect of the present invention. The dashed lines represent the boundary of the background "care" pixels; the pixels comprising the dashed lines and the pixels within the dashed lines are "don't care" in the background since when the document image is reassembled the foreground will be placed over the background based, at least in part, upon reconstruction information stored in the mask. In the instance where the letters "C" and "O" and/or the bar are constant color(s) and/or have smooth color transition(s), effective compression of the foreground can be achieved using one of a variety of smoothing and/or compression technique(s). Effective compression of the background can be achieved by replacing the "don't care" pixel(s) with pixel value(s) that allow for smoother transition(s). One exemplary simple algorithm for filling the "don't care" pixels is to process the background with a low pass filter, and then restore the important pixels. After a few iterations of these two steps, the "don't care" pixels end up with values that allow smooth transition(s), and which will compress well. A simple refinement of this algorithm is to start with a very low pass filter and increase the cutting frequency of the low pass filter at each iteration. A similar algorithm can be used to fill the foreground.

Turning back to FIG. 1, the mask separator component 100 includes a pixel energy component 130, a region merge component 140 and a mask storage component 150.

The pixel energy component 130 is adapted to calculate pixel energy for region(s) of the document image 110 (e.g., variances). For example, in the instance where the document image 110 is a YUV representation, the pixel energy component 130 calculates pixel energy variances based on the Y component and/or suitable combination of the YUV components of the YUV representation. For purposes of calculation, the foreground and the background can be assumed constant over a region. It is desired to calculate a mask 120 that minimizes the variance around those constants. The variance is used as an estimate of the compression that would be obtained for the foreground and/or the background. Alternatively, the region(s) could be compressed and the number of bits could be measured quantitatively; however, the computational overhead would be prohibitively expensive. Accordingly, calculating the variance, which is also an energy measure based on a sum of the square distances, is an acceptable estimate of the size of the foreground and background after compression.

Assuming that a region is a set S of N pixels, and that a foreground F and a background B are a partition of S such that $F \cup B = S$ and $F \cap B = \emptyset$. If f(x) is the image value at pixel location x, $x \in S$, the variance of the foreground and background are respectively:

$$v_F = \sum_{x \in F} (f(x) - \mu_F)^2 \tag{1}$$

$$v_B = \sum_{x \in B} (f(x) - \mu_B)^2 \tag{2}$$

Where $$\mu_F = \frac{1}{N_F} \sum_{x \in F} f(x)$$

and $$\mu_B = \frac{1}{N_B} \sum_{x \in B} f(x)$$

are, respectively, the mean pixel value of the foreground and the background, and $N_F$ and $N_B$ are, respectively, the number of pixels in the foreground and the background. Note that these variances can also be expressed as:

$$v_F = \sum_{x \in F} f(x)^2 - N_F \mu_F^2 \tag{3}$$

$$v_B = \sum_{x \in B} f(x)^2 - N_B \mu_B^2 \tag{4}$$

Next, a suitable partition F and B of S, based at least in part upon minimization of energy of the foreground and/or the background (e.g., variances) is determined by the pixel energy component 130 (e.g., which will minimize the sum $E = v_F + v_B$). However, finding a suitable partition F and B of S can be computationally intensive since there are $2^N$ possible masks.

Figures 5, 6, 7:
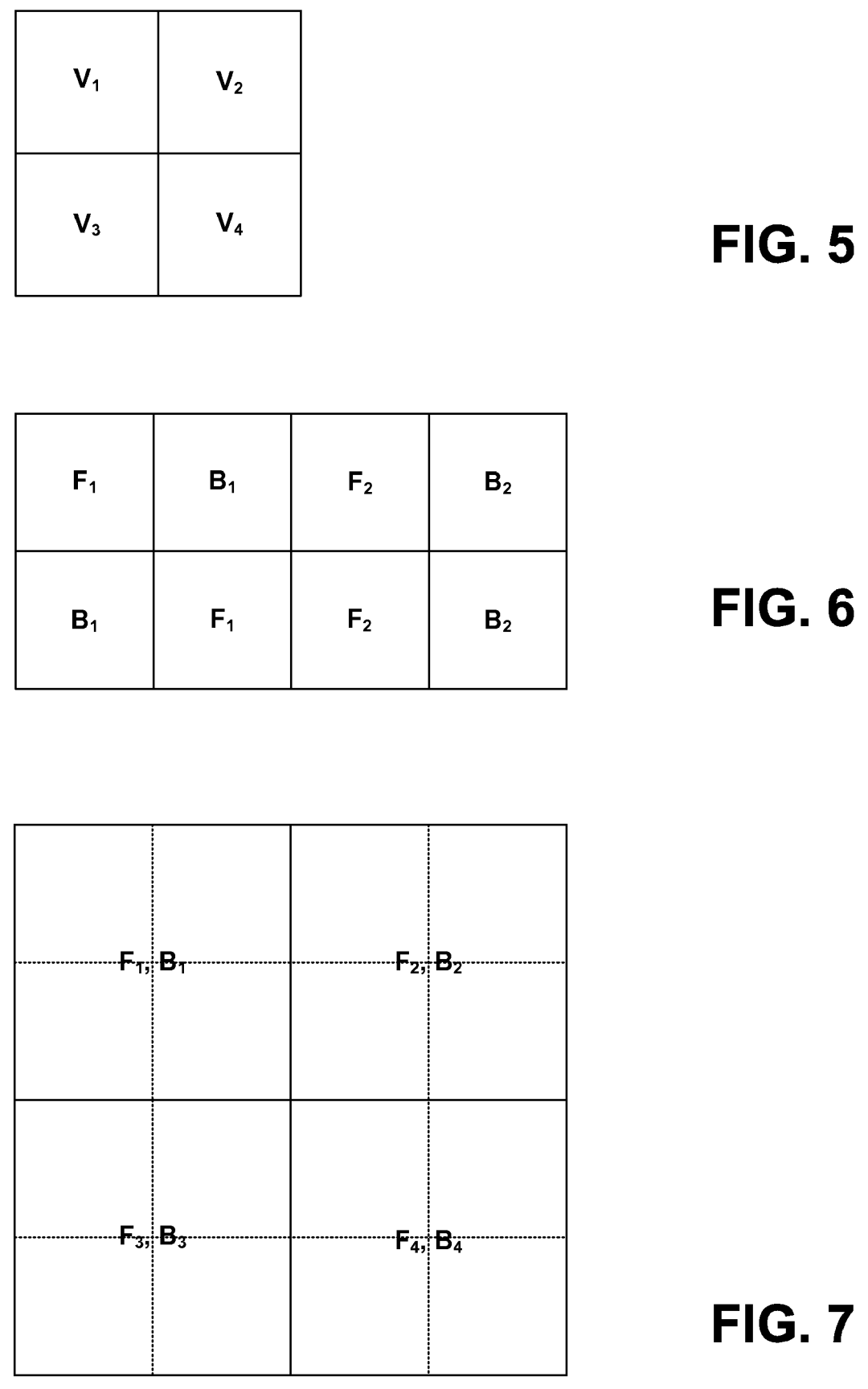

In order to simplify computation, the document image can be divided into regions, for example two pixel by two pixel regions. Turning briefly to FIG. 5, a two pixel by two pixel region of a document image in accordance with an aspect of the present invention is illustrated. The four pixels have values $V_1$, $V_2$, $V_3$ and $V_4$. For each two pixel by two pixel region, there are only $2^4 = 16$ possible masks. Accordingly for each of these two pixel by two pixel regions, it is possible to find the optimal F and B, which minimize $E = v_F + v_B$ by calculating E for all 16 combination and utilizing the one with smallest energy.

However, utilizing a K-means clustering algorithm, where K=2, since the document image is a scalar function, the values f(x) can be sorted which yield a solution which can be computed efficiently. Assuming the sorted order is $V_1$ $V_2$ $V_3$ $V_4$, the K-means clustering algorithm, where K=2 yields three possible partitions:

| Potential Foreground | Potential Background |
|---|---|
| $V_1$ | $V_2$ $V_3$ $V_4$ |
| $V_1$ $V_2$ | $V_3$ $V_4$ |
| $V_1$ $V_2$ $V_3$ | $V_4$ |

It can be shown that substantially all other combination would have equal or higher energy. This is intuitive since there should always be a grouping of contiguous value which has a lower variance than a grouping of non-contiguous values. If the sorting order was different, the pixel can always be re-labeled so that $V_1$ $V_2$ $V_3$ $V_4$ are sorted. It is then straight forward to determine which of the three possible partitions of foreground and background yields the lowest energy. Significantly, the pixel energy component 130 can store the partial sum $$\sum_F f(x), \sum_F f(x)^2, \sum_B f(x) \text{ and/or } \sum_B f(x)^2$$

to minimize computational overhead. Further, the pixel energy component 130 can, at least temporarily, store at least some of the partial sums $$\sum_F f(x), \sum_F f(x)^2, \sum_B f(x) \text{ and/or } \sum_B f(x)^2$$

along with $N_F$ and/or $N_B$ (e.g., for use by the region merge component 140 and/or the mask storage component 150).

Additionally, in order to minimize computational overhead, energy for a small region (e.g., four pixel by four pixel) can be calculated. If the energy is less than a threshold amount, all of the pixels can be assigned to the foreground or the background with the other being the empty. If the energy is greater to or equal to the threshold energy, partitioning can proceed as described previously. Although this partition could not be optimal, no adverse effect are observed if the threshold is sufficiently small. For relatively clean document image(s) (e.g., having constant area(s)), a significant increase in computational speed can be achieved.

Further, region(s) that are substantially constant (e.g., pure foreground or pure background) can also be set after the mask separating the foreground and the background has been computed. For example, if the difference between the average foreground and the average background is less than a certain threshold, which can be determined experimentally (e.g., a value of 40 can be used compared to the full scale of gray levels which go from 0 to 255), the entire region is set to either foreground or background (depending on whether the average is closer to 0 or to 255).

Referring back to FIG. 1, partitioning the document image 110 into two pixel by two pixel regions can result in region(s) having distinct foreground(s) and background(s) that could pick up pixel noise. This can lead to a mask 120 that looks like salt and pepper that would be inconsistent with the goal of being able to capture text and/or graphic lines in the mask 120. Thus, the region merge component 140 is adapted to attempt to merge pairs of regions of the document image 110 based, at least in part, upon a determination of whether energies of a foreground and/or a background of the potential merged regions are less than a first threshold energy. The region merge component 140 can utilize the partial sums $$\sum_F f(x), \sum_F f(x)^2, \sum_B f(x) \text{ and/or } \sum_B f(x)^2$$

along with $N_F$ and/or $N_B$ calculated and stored by the pixel energy component 130.

After each merge, these quantities must be recomputed, but fortunately, this is also done in constant time by just summing those quantities according to the foreground and background combination. Also note that the sum $\Sigma f(x)^2$ over all the regions is constant for each partition, and need not be calculated for the purpose of selecting the optimal partition. However, this quantity will still be needed to decide when not to merge regions.

Referring briefly to FIG. 6, potential merging of a first region having a foreground $F_1$ and a background $B_1$ with a second region having a foreground $F_2$ and a background $B_2$ is illustrated. In determining whether energies of the regions to be merged are less than the first threshold energy, the region merge component 150 can calculate groupings of a new foreground and a new background. Energy variances within the two regions have seven possible groupings of a new foreground and a new background:

| New Foreground of Potential Merged Region | New Background of Potential Merged Region |
|---|---|
| $F_1$ | $B_1$ $F_2$ $B_2$ |
| $F_1$ $B_1$ $F_2$ | $B_2$ |
| $F_1$ $B_2$ $F_2$ | $B_1$ |
| $F_2$ | $F_1$ $B_1$ $B_2$ |
| $F_1$ $F_2$ | $B_1$ $B_2$ |
| $F_1$ $B_1$ | $F_2$ $B_2$ |
| $F_1$ $B_2$ | $F_2$ $B_1$ |

If at least one of the possible groupings provide background and/or foreground energies less than the first threshold energy, the region merge component 140 can determine a suitable foreground/background partition of the merged region, for example, based at least in part upon minimization of background and foreground energies (e.g., $E=v_F+v_B$). If none of these grouping provide an energy lower than the first threshold energy, the merge does not occur, and these regions will not be further considered for merging. By default F1 and F2 will be used to compute the foreground pixels, while B1 and B2 will be used to compute the background pixels.

The region merge component 140 can continue to attempt to merge larger regions until the first threshold energy would be exceeded and/or substantially all of the document image 110 has been merged. For example, the region merge component 140 can merge horizontally adjoining two by two regions into a two by four region as illustrated in FIG. 6. Thereafter, the region merge component 140 can vertically merge regions into a four by four region as illustrated in FIG. 7. Generally, the first threshold energy value can be can be selected to mitigate potential situation(s) in which attempted merge(s) would partition several gray levels into the foreground or into the background, with a potential loss of important detail(s), such as text (e.g., when there are more than two colors in a region). For example if a first region has text written in gray over white, and second region is mostly black, the merge of the two regions may lead to gray and white going into the foreground and black into background of the resulting merged region, thus resulting in a loss of substantially all the textual information from the mask 120. However, whenever two colors are merged in either foreground or background, a sharp increase of energy for that region occurs, since a constant is no longer a good model for this region.

Further, as an alternative to calculating resulting energy for substantially all seven combinations, the average in foregrounds and backgrounds can be sorted and partitioning can be considered with respect to the sorted averages. As for the sorting of the values $V_1$ $V_2$ $V_3$ $V_4$, this brings down the number of partitions to 3 (sort $F_1$ $B_1$ $F_2$ $B_2$ by average and consider the partitions which respect the order).

Additionally and/or alternatively, the region merge component 120 can evaluate a restricted subset of combinations of foregrounds and backgrounds of the two regions, based on an approximation f over the given regions. The region merge component 120 can select the combination with a least cumulative energy.

Once a region can no longer be merged because such merge would increase the energy beyond the first threshold, the pixel in this region can be partitioned into foreground and background. Such partition may can be carried along each merge, but this would be computationally expensive. Alternatively, the merge region component 140 can calculate an average of substantially all of the pixel values of the merged region and assign pixel(s) having a value greater than the average to the foreground with the remaining pixel(s) being assigned to the background. Alternatively, pixel(s) having a value greater than the average can be assigned to the background with the remaining pixel(s) being assigned to the foreground.

Referring back to FIG. 1, once merging has been exhausted by the region merge component 140, the mask storage component 150 is adapted store information associated with the partitioning of the foreground and the background performed by the pixel energy component 130 and/or the merge region component 140 in the mask 120. Thus, the mask 120 indicates whether each pixel of the document image 110 belongs in the foreground and/or background.

In one example, in order to minimize computational overhead, energy for a small region (e.g., four pixel by four pixel) can be calculated by the pixel energy component 130. If the energy is less than a second threshold energy, substantially all of the pixels can be assigned to the foreground or the background with the other being substantially empty. If the energy is greater to or equal to the second threshold energy, partitioning can proceed as described previously. For relatively clean document image(s) (e.g., having constant area(s)), a significant increase in computational speed can be achieved.

In another example, in order to minimize the size of the mask, if a final region (e.g., a region that cannot be merged without exceeding the first threshold), has a difference between the average foreground and the average background that is higher than a third threshold, the whole region is declared foreground or declared background, depending on whether the global average for the region is more or less than the middle gray level value (e.g., 127 if the gray level values are between 0 and 255). For color document that have a slight dithering, the mask for these region would look like salt and pepper without this optimization and would have high compression cost. The third threshold is chosen so as to not lose important text, and yet remove the many cases of slight dithering seen in scanning printed document (e.g., many printers have only 4 to 6 colors and must use dithering to generate the full palette of colors). For example, a value of 40 can be a good choice for the third threshold.

The mask separator component 100 has been described with regard to an assumption that the foreground and background were each generally constant. However, in accordance with an aspect of the present invention, a polynomial regression can be used by the pixel energy component 130 to describe the foreground and/or the background. For example, if the polynomials of the foreground and/or the background are planes of equation $\alpha x+\beta y+\mu$, the energy would be defined by:

$$v_F = \sum_{x,y\in F} (f(x, y) - \alpha_F x + \beta_F y + \mu_F)^2$$

$$v_B = \sum_{x,y\in B} (f(x, y) - \alpha_B x + \beta_B y + \mu_B)^2$$

Where x, y index the pixel locations, and $\alpha_F$, $\beta_F$ and $\mu_F$ are scalars that minimize $v_F$ and $\alpha_B$, $\beta_B$ and $\mu_B$ are scalars that minimize $v_B$. Note that $\alpha_F$, $\beta_F$ and $\mu_F$ can be solved in constant time using the quantities $\Sigma f(x, y)^2$, $\Sigma f(x, y)x$, $\Sigma f(x, y)y$, and $\Sigma f(x, y)$ which is a linear system of three unknowns and three equations. Similarly, $\alpha_B$, $\beta_B$ and $\mu_B$ can be solved in a similar manner. As previously described with regard to a generally constant foreground and/or background, the pixel energy component 130 proceeds to calculate pixel energies for small regions partitioning the region into a foreground and background based on energy minimization. Thereafter, the small regions are attempted to be successively merged by the merge region component 140 based, at least in part, upon a minimization of energy (E) at each attempted merger. However, the foregrounds and backgrounds cannot be sorted by average, and therefore all 7 combinations must be tested to find which combination minimizes E. In order to facilitate mergers, the quantities $\Sigma f(x, y)^2$, $\Sigma(x, y)x$, $\Sigma f(x, y)y$, $\Sigma f(x, y)$ and N can be stored for each region for the foreground and the background.

Again to minimize computational overhead, energy for a small region (e.g., four pixel by four pixel) can be calculated by the pixel energy component 130. However, the pixel energy component 130 can utilize a model based upon a constant over the region and/or utilizing a polynomial regression.

Additionally and/or alternatively, the pixel energy component 110 can calculate energy using planar regression. The energy of the foreground $v_F$ and the background $v_B$, are defined as:

$$v_F = \sum_{x,y\in F} (f(x, y) + A_F x + B_F y + C_F)^2$$

$$v_B = \sum_{x,y\in B} (f(x, y) + A_B x + B_B y + C_B)^2$$

where F is the foreground, B is the background, f(x, y) is the value of the pixel at location x, y. Further, $A_F$, $B_F$, $C_F$ are chosen to minimize the energy of the foreground $v_F$, and, $A_B$, $B_B$, $C_B$ are chosen to minimize the energy of the background $v_B$. For example, minimization of the energy of the foreground $v_F$ can be obtained by solving the equation system (3 unknowns, 3 equations):

$$\frac{\partial v_F}{\partial A_F} = 0, \quad \frac{\partial v_F}{\partial B_F} = 0, \quad \frac{\partial v_F}{\partial C_F} = 0$$

where, for instance:

$$\frac{\partial v_F}{\partial A_F} = \sum_{x,y \in F} 2(f(x, y) + A_F x + B_F y + C_F)x = 0$$

similar calculations can be solved for the energy of the background $v_B$.

While FIG. 1 is a schematic diagram illustrating components for the mask separator component 100, it is to be appreciated that the mask separator component 100 can be implemented as one or more components, as that term is defined herein. Thus, it is to be appreciated that computer executable components operable to implement the mask separator component 100 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 8:
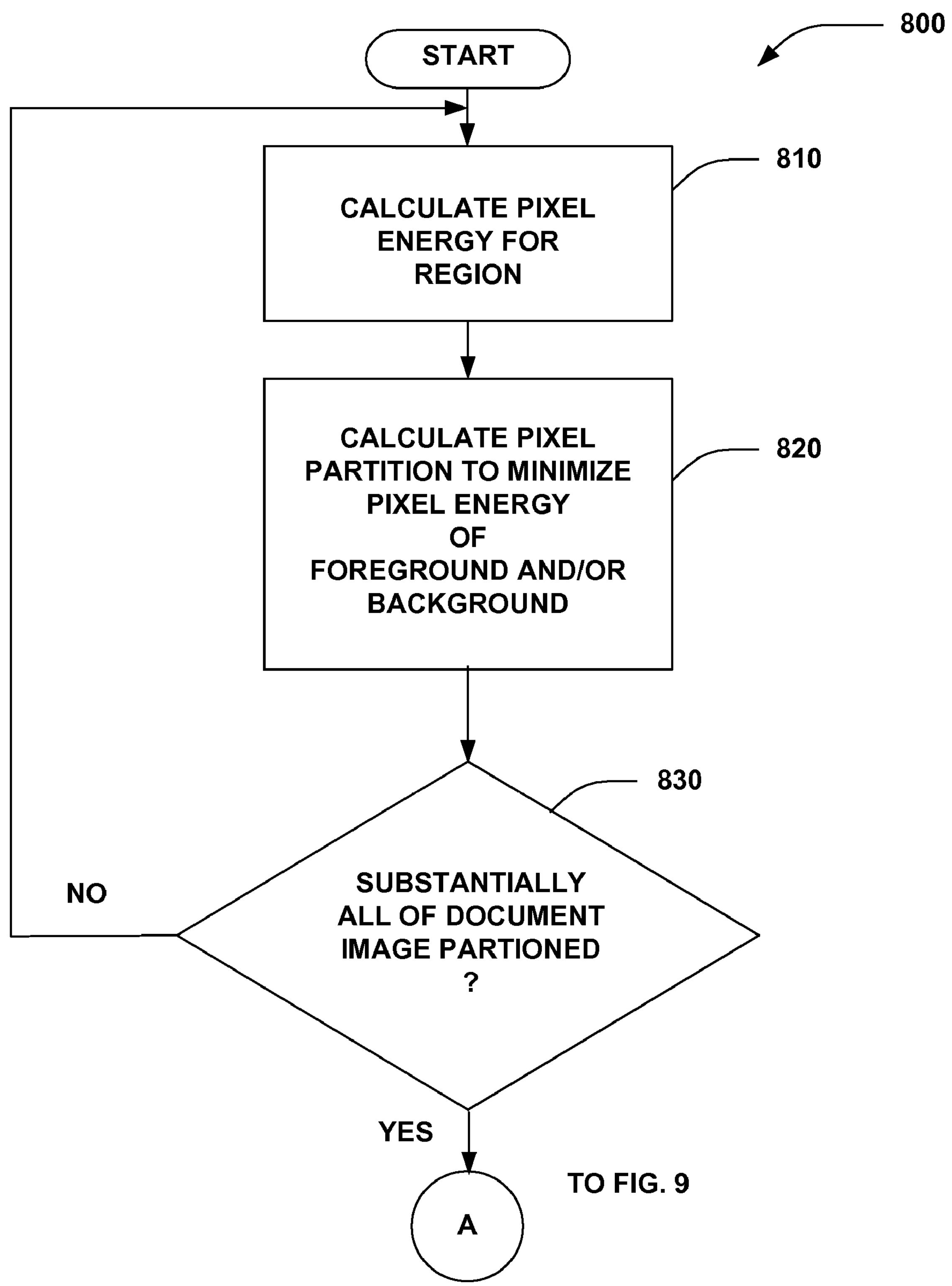
FIG. 8 is a flow chart illustrating a methodology for generating a mask in accordance with an aspect of the present invention.
Figure 9:
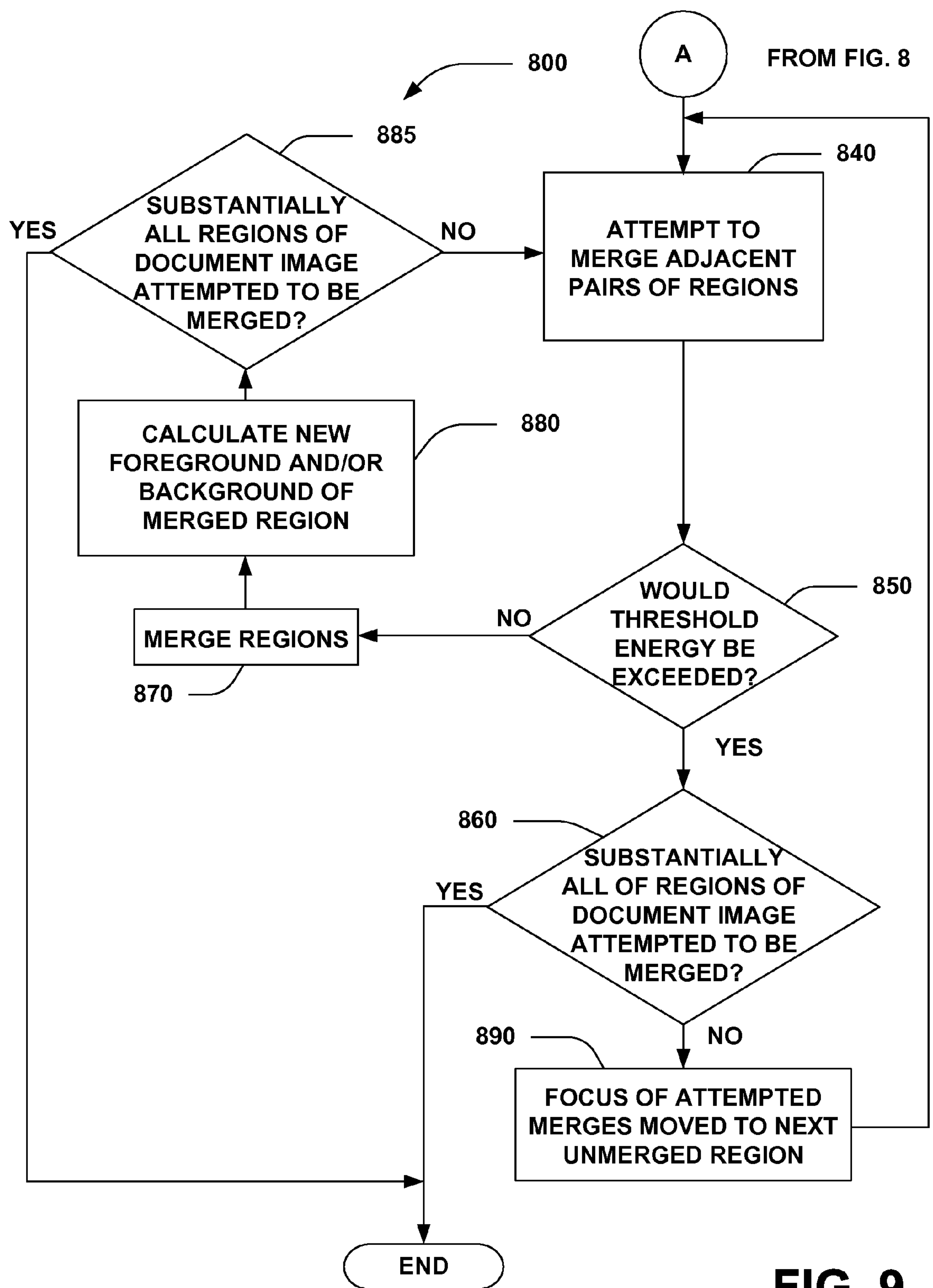
FIG. 9 is a flow chart further illustrating the methodology of FIG. 8.

In view of the exemplary systems shown and described above, a methodology that may be implemented in accordance with the present invention will be better appreciated with reference to the flow charts of FIGS. 8 and 9. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIGS. 8 and 9, a methodology 800 for generating a mask in accordance with an aspect of the present invention is illustrated. At 810, pixel energy (e.g., variances) for a region of a document image are calculated. For example, the calculated pixel energy can be variances can be based, at least in part, upon a polynomial regression of the region. Further, the calculated pixel energy variances can be calculated utilizing a calculated mean pixel value for a foreground and a calculated mean pixel value for a background employed in a sum of squares distances for substantially all of the pixels in the region. Alternatively, the calculated pixel energy variances can be calculated utilizing a sum of pixel values for a background and a calculated sum of pixel values for a foreground.

Next, at 820, a pixel partition for the region to minimize pixel energy of a foreground and/or a background is calculated. At 830, a determination is made as to whether substantially all regions of the document image have been partitioned. If the determination at 830 is NO, processing continues at 810. If the determination at 830 is YES, processing continues at 840.

Next, at 840, adjacent pairs of regions are attempted to be merged. At 850, a determination is made as to whether the attempted merger would result in a threshold energy being exceeded in a new foreground and/or new background. If the determination at 850 is YES, processing continues at 860. If the determination at 850 is NO, at 870, the regions are merged. At 880, a new foreground and background partition of the merged region is calculated. At 885, a determination is made whether substantially all regions of the document image have been attempted to be merged. If the determination at 885 is YES, no further processing occurs. If the determination at 885 is NO, processing continues at 840.

At 860, a determination is made as to whether substantially all regions of the document image have been attempted to be merged. If the determination at 860 is NO, at 890, focus of attempted merges is moved to the next unmerged region (e.g., two pixel by two pixel region). If the determination at 860 is YES, no further processing occurs.

Figure 10:
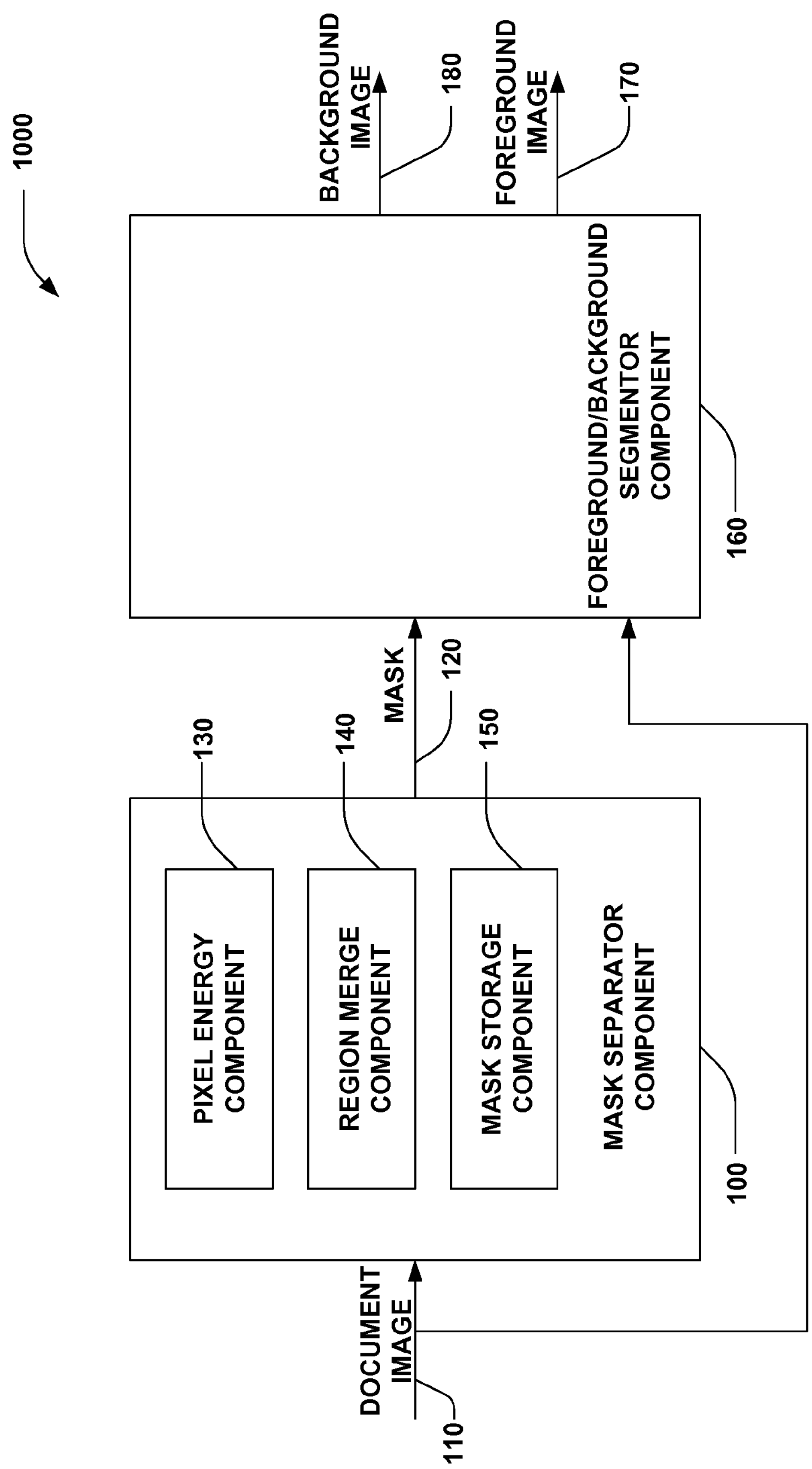
FIG. 10 is a block diagram of a document image separation system in accordance with an aspect of the present invention.

Next, referring to FIG. 10, a system 1000 for document image separation in accordance with an aspect of the present invention is illustrated. The system 1000 includes a mask separator component 100 and a foreground/background segmenter 160. The mask separator component 100 includes a pixel energy component 130, a region merge component 140 and a mask storage component 150.

As described above, in accordance with an aspect of the present invention, the mask separator component 100 receives a document image 110 as an input. The mask separator component 100 processes the document image in order to generator a mask 120 as an output.

The foreground/background segmenter 160 receives the mask 120 and the document image 110 as inputs. Based, at least in part, upon the mask 120, the foreground/background segmenter 160 is adapted to separate the document image 110 into a foreground image 170 and a background image 180. For example, substantially all pixel(s) represented by a "1" in the mask 120 can go to the foreground image 170 and substantially all pixel(s) represented by a "0" in the mask 120 can go to the background image 180. Conversely, as an example, substantially all pixel(s) represented by a "0" in the mask 120 can go to the foreground image 170 and substantially all pixel(s) represented by a "1" in the mask 120 can go to the background image 180.

For example, the mask separator component 100 can process a document image 110 comprising text by separating pixels (e.g., associated with the text) into a foreground and storing information regarding which pixels are in the foreground in a mask 120. Thereafter, the foreground/background segmenter 160 can receive the mask 120 and the document image 110. The foreground/background segmenter 160 can separate the document image 110 into the foreground image 170 and the background image 180.

Figure 11:
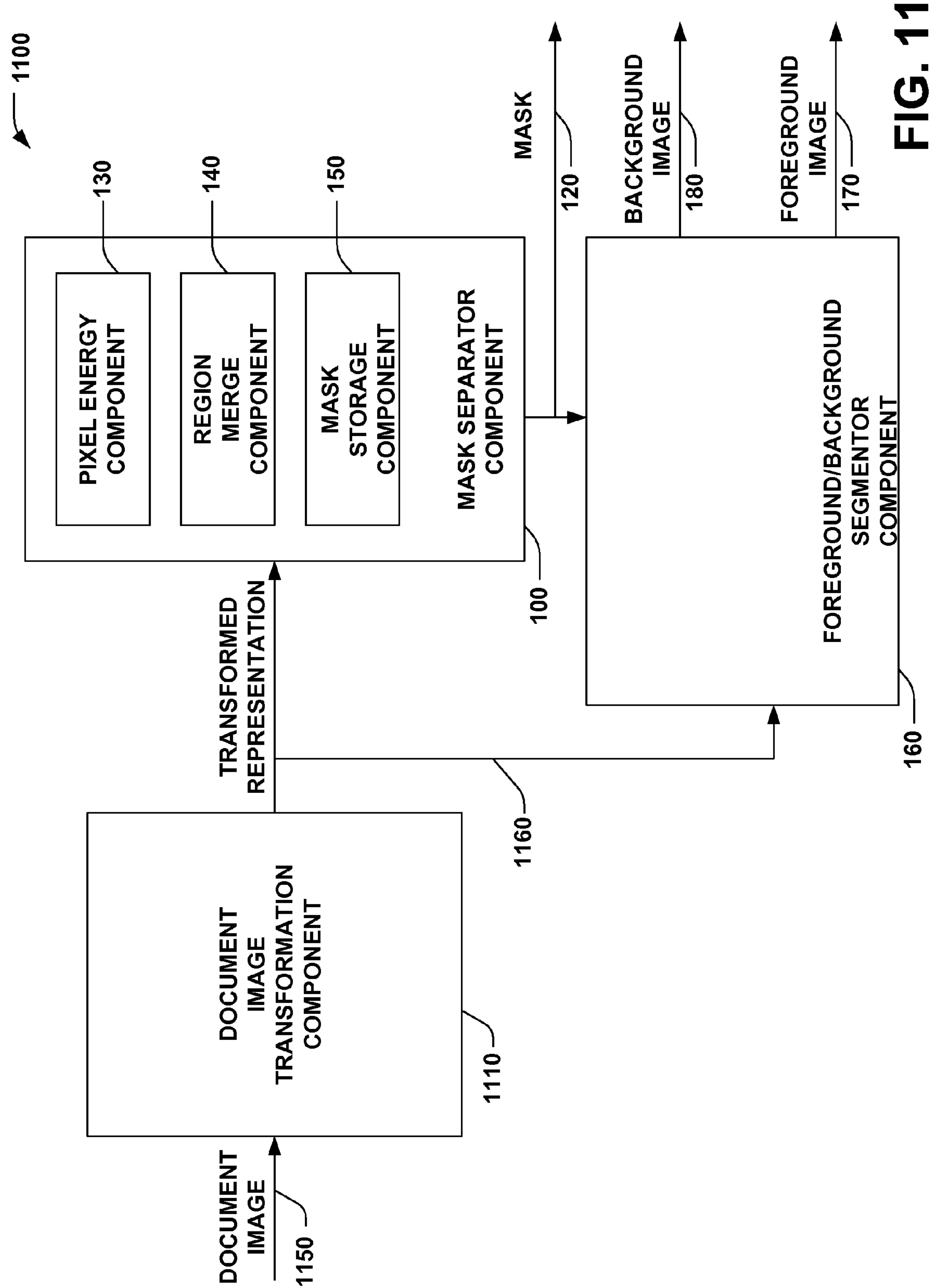
FIG. 11 is a block diagram of a document image compression in accordance with an aspect of the present invention.

Turning to FIG. 11, a system 1100 for document image compression in accordance with an aspect of the present invention is illustrated. The system 1100 includes a document image transformation component 1110, a mask separation component 100 and a foreground/background segmenter component 160. The foreground/background segmenter 160 receives the mask 120 and the document image 1150 as inputs. Based, at least in part, upon the mask 120, the foreground/background segmenter 160 is adapted to separate the document image 1150 into a foreground image 170 and a background image 180.

Figure 12:
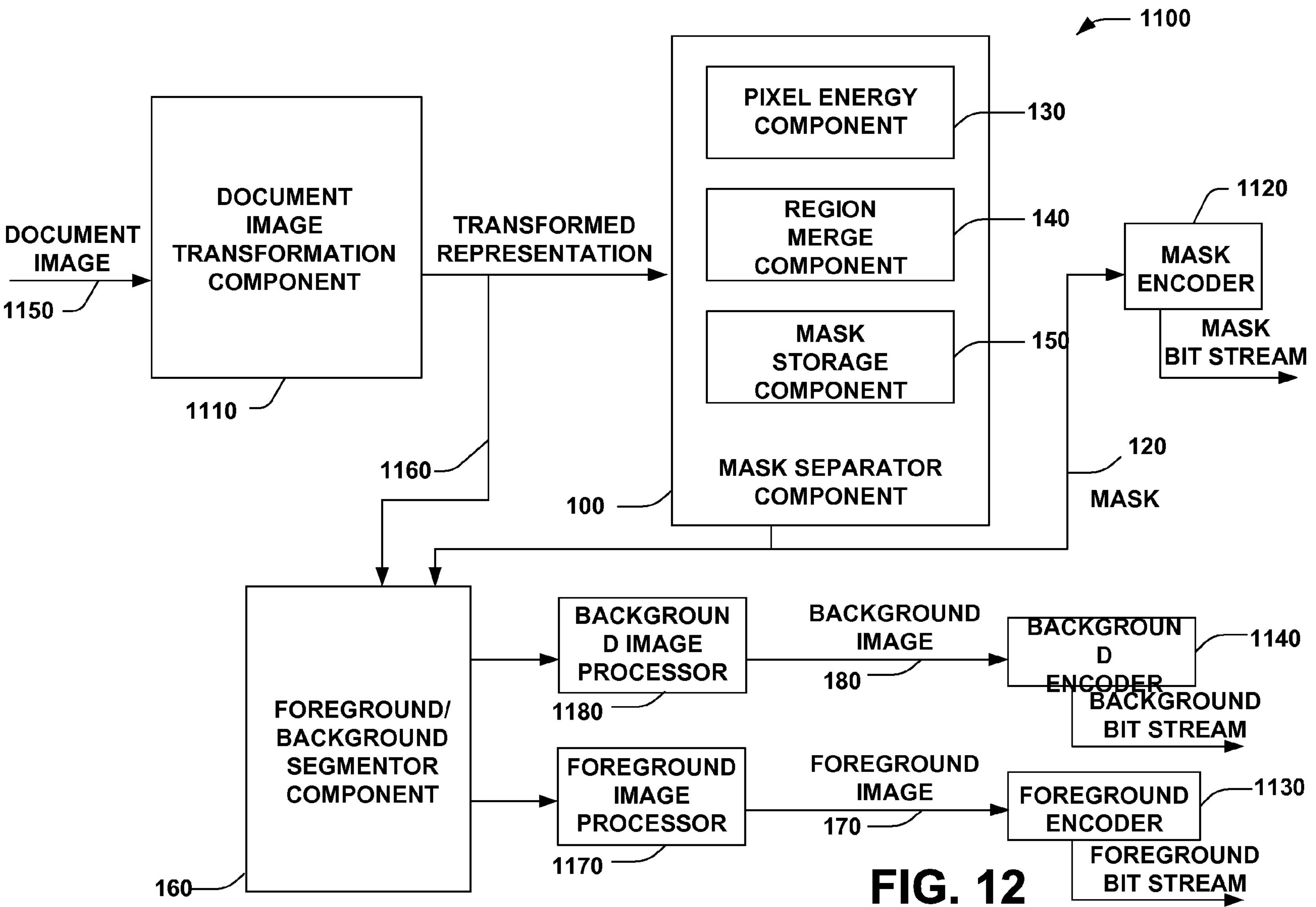
FIG. 12 is a block diagram of a document image compression in accordance with an aspect of the present invention.

As illustrated in FIG. 12, the system 1100 can, optionally, include a mask encoder 1120, a foreground encoder 1130 and/or a background encoder 1140. The mask separation component 100 includes a pixel energy component 130, a region merge component 140 and a mask storage component 150. Optionally, the system 110 can include a foreground image processor 1170 and/or a background image processor 1180.

The document image transformation component 1110 is adapted to receive a document image 1150 and output a transformed representation of the document image 1160. For example, the document image transformation component 1110 can receive an RGB document image and output a YUV representation of the RGB document image.

The mask encoder 1120 is adapted to encode the mask 120. For example, since the mask 120 is typically binary, the mask encoder 1120 can utilize conventional binary compression technique(s) in order to achieve effective compression of the mask. The mask encoder 1120 outputs mask bit stream.

The foreground encoder 1130 is adapted to encode the foreground image 170. The foreground is an image composed of the foreground pixels, and "don't care" pixels (e.g., pixel(s) that originally belonged to the background). The foreground image processor 1170 can be used to fill the "don't care" pixels with values which facilitate compression and provide the altered foreground image to the foreground encoder 1130. For example, in the instance where the foreground image 170 generally comprises textual information in black color, the "don't care" pixel may also be filled in black, such that the whole foreground image is black. The foreground encoder 1130 can utilize compression technique(s) effective for image compression, such as JPEG, wavelets, or any other image compression algorithms. The foreground encoder 1130 outputs a foreground bit stream.

The background encoder 1140 is adapted to encode the background image 180. The background is an image composed of the background pixels, and "don't care" pixels (e.g., pixel(s) that originally belonged to the foreground). The background image processor 1180 can be used to fill the "don't' care" pixels with values which facilitate compression and provide the altered background image to the background encoder 1140. For example, in the instance where the background image 180 comprises smooth white page, the "don't care" pixels which are located where the text was can be filled with white, such that the whole background image is white. The background encoder 1140 can utilize compression technique(s) effective for image compression, such as JPEG, wavelets, or any other image compression algorithms. The background encoder 1140 outputs a background bit stream.

For example, a simple algorithm for filling the "don't care" pixels is to process the image with a low pass filter, and then restore the important pixels. After a few iterations of these two steps, the "don't care" pixels end up with values that allow smooth transition(s), and which will compress well. A simple refinement of this algorithm is to start with a very low pass filter and increase the cutting frequency of the low pass filter at each iteration.

Further, the foreground encoder 1130 and/or the background encoder 1140 can utilize the mask 120 to improve compression of the foreground and/or the background. It is to be appreciated that numerous encoders and/or decoders are contemplated that utilize a mask which is based, at least in part, upon a partition of a document image based, at least in part, upon minimization of pixel energy variances of at least one of a foreground and a background in connection with the subject invention. Any such encoder and/or decoder suitable for employment in connection with the present invention is intended to fall within the scope of the appended claims.

The mask bit stream, the foreground bit stream and/or the background bit stream can be combined into a single bit stream and/or sent individually to, for example, a decoding system (not shown). The decoding system can decode the mask bit stream in order to obtain the mask 120. Alternatively, the decoding system can receive the mask 120. The decoding system can utilize the mask 120 in order to recombine the foreground bit stream and/or the background bit stream into a document image.

It is to be appreciated that the system and/or method of the present invention can be utilized in an overall segmented layered image system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras, digital video cameras and/or video game systems.

Figure 13:
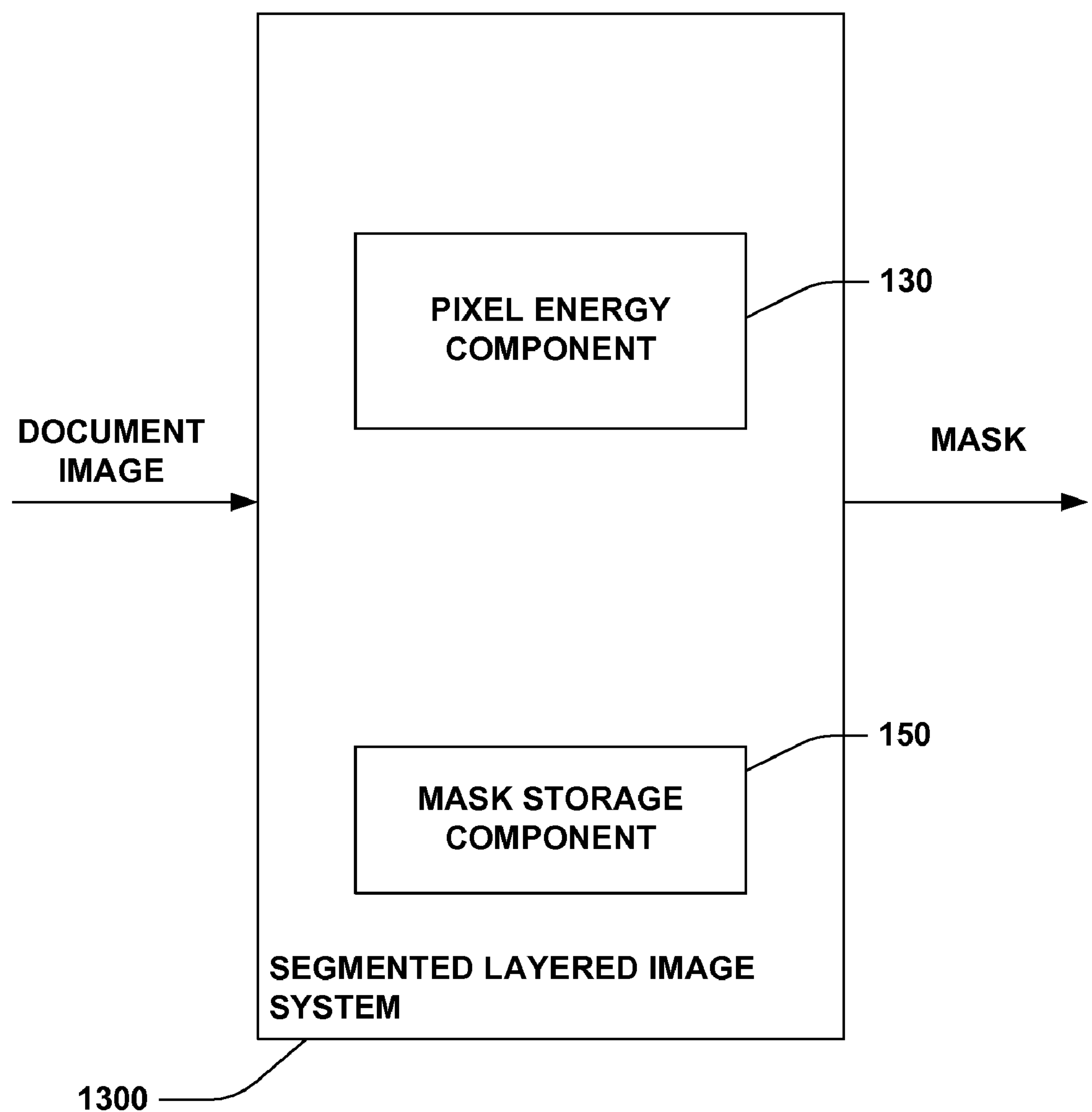
FIG. 13 is a block diagram of a segmented layered image system in accordance with an aspect of the present invention.

Turning to FIG. 13, a segmented layered image system 1300 is illustrated. The system 1300 includes a pixel energy component 130 and a mask storage component 150.

The pixel energy component 130 is adapted to calculate pixel energy variances for a region of a document image. Further, the pixel energy component 130 further adapted to calculate a partition of the region based at least in part upon minimization of pixel energy (e.g., variances) of at least one of a foreground and a background.

The mask storage component 150 is adapted to store information associated with the partition in a mask. For example, the system 1300 can be employed in a vast array of document image applications, including, but not limited to, photocopiers, document scanners, optical character recognition systems, PDAs, fax machines, digital cameras digital video cameras and/or video game systems.

Figure 14:
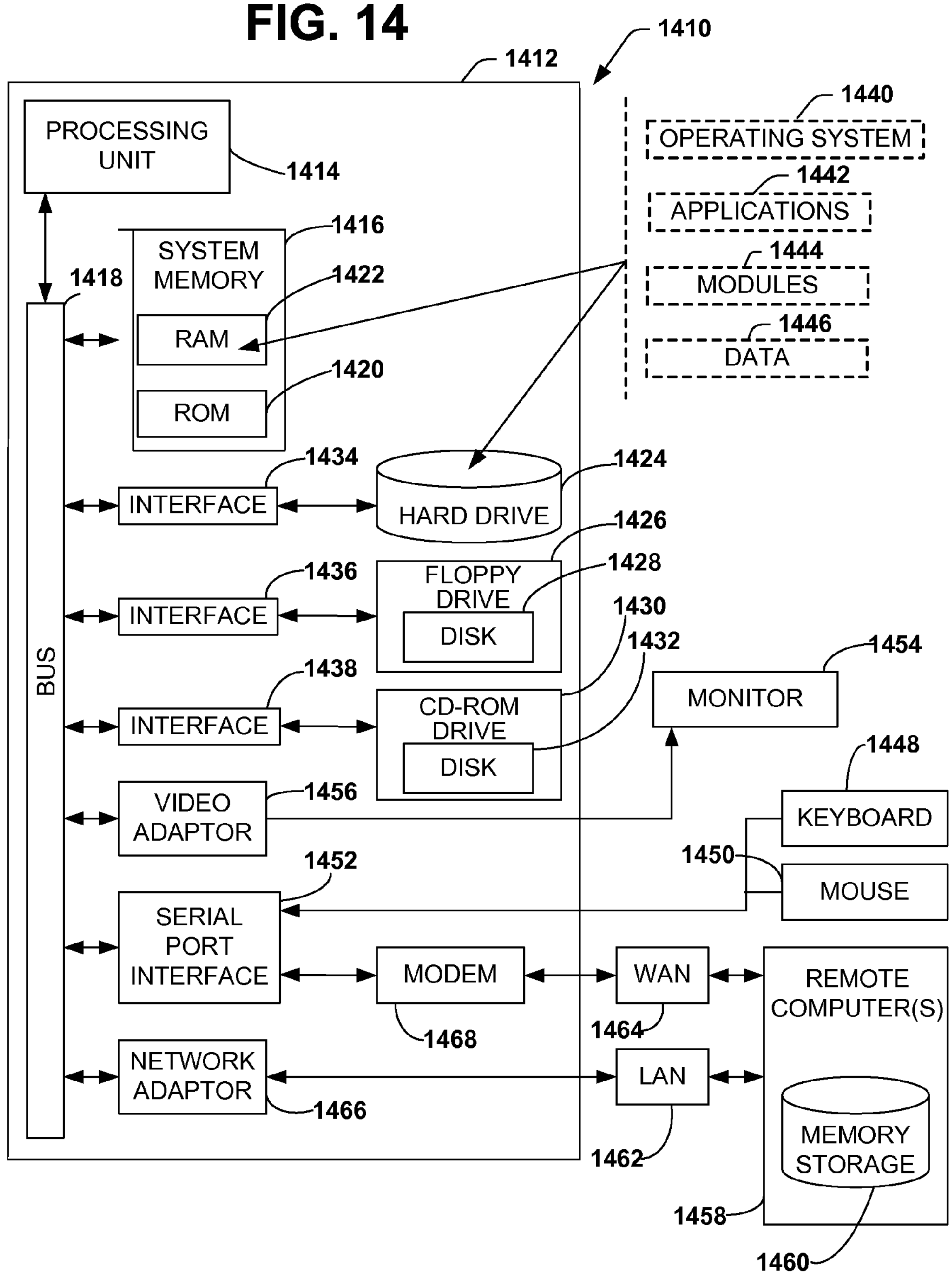
FIG. 14 is a schematic block diagram of an exemplary operating environment for a system configured in accordance with the present invention.

In order to provide additional context for various aspects of the present invention, FIG. 14 and the following discussion are intended to provide a brief, general description of one possible suitable computing environment 1410 in which the various aspects of the present invention may be implemented. It is to be appreciated that the computing environment 1410 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 14 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 14, an exemplary environment 1410 for implementing various aspects of the invention includes a computer 1412, including a processing unit 1414, a system memory 1416, and a system bus 1418 that couples various system components including the system memory to the processing unit 1414. The processing unit 1414 may be any of various commercially available processors. Dual microprocessors and other multi-processor architectures also can be used as the processing unit 1414.

The system bus 1418 may be any of several types of bus structure including a memory bus or memory controller, a peripheral bus, and a local bus using any of a variety of commercially available bus architectures. The computer memory 1416 includes read only memory (ROM) 1420 and random access memory (RAM) 1422. A basic input/output system (BIOS), containing the basic routines that help to transfer information between elements within the computer 1412, such as during start-up, is stored in ROM 1420.

The computer 1412 may further include a hard disk drive 1424, a magnetic disk drive 1426, e.g., to read from or write to a removable disk 1428, and an optical disk drive 1430, e.g., for reading a CD-ROM disk 1432 or to read from or write to other optical media. The hard disk drive 1424, magnetic disk drive 1426, and optical disk drive 1430 are connected to the system bus 1418 by a hard disk drive interface 1434, a magnetic disk drive interface 1436, and an optical drive interface 1438, respectively. The computer 1412 typically includes at least some form of computer readable media. Computer readable media can be any available media that can be accessed by the computer 1412. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1412. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1422, including an operating system 1440, one or more application programs 1442, other program modules 1444, and program non-interrupt data 1446. The operating system 1440 in the computer 1412 can be any of a number of commercially available operating systems.

A user may enter commands and information into the computer 1412 through a keyboard 1448 and a pointing device, such as a mouse 1450. Other input devices (not shown) may include a microphone, an IR remote control, a joystick, a game pad, a satellite dish, a scanner, or the like. These and other input devices are often connected to the processing unit 1414 through a serial port interface 1452 that is coupled to the system bus 1418, but may be connected by other interfaces, such as a parallel port, a game port, a universal serial bus ("USB"), an IR interface, etc. A monitor 1454, or other type of display device, is also connected to the system bus 1418 via an interface, such as a video adapter 1456. In addition to the monitor, a computer typically includes other peripheral output devices (not shown), such as speakers, printers etc.

The computer 1412 may operate in a networked environment using logical and/or physical connections to one or more remote computers, such as a remote computer(s) 1458. The remote computer(s) 1458 may be a workstation, a server computer, a router, a personal computer, microprocessor based entertainment appliance, a peer device or other common network node, and typically includes many or all of the elements described relative to the computer 1412, although, for purposes of brevity, only a memory storage device 1460 is illustrated. The logical connections depicted include a local area network (LAN) 1462 and a wide area network (WAN) 1464. Such networking environments are commonplace in offices, enterprise-wide computer networks, intranets and the Internet. When used in a LAN networking environment, the computer 1412 is connected to the local network 1462 through a network interface or adapter 1466. When used in a WAN networking environment, the computer 1412 typically includes a modem 1468, or is connected to a communications server on the LAN, or has other means for establishing communications over the WAN 1464, such as the Internet. The modem 1468, which may be internal or external, is connected to the system bus 1418 via the serial port interface 1452. In a networked environment, program modules depicted relative to the computer 1412, or portions thereof, may be stored in the remote memory storage device 1460. It will be appreciated that the network connections shown are exemplary and other means of establishing a communications link between the computers may be used.

Figure 15:
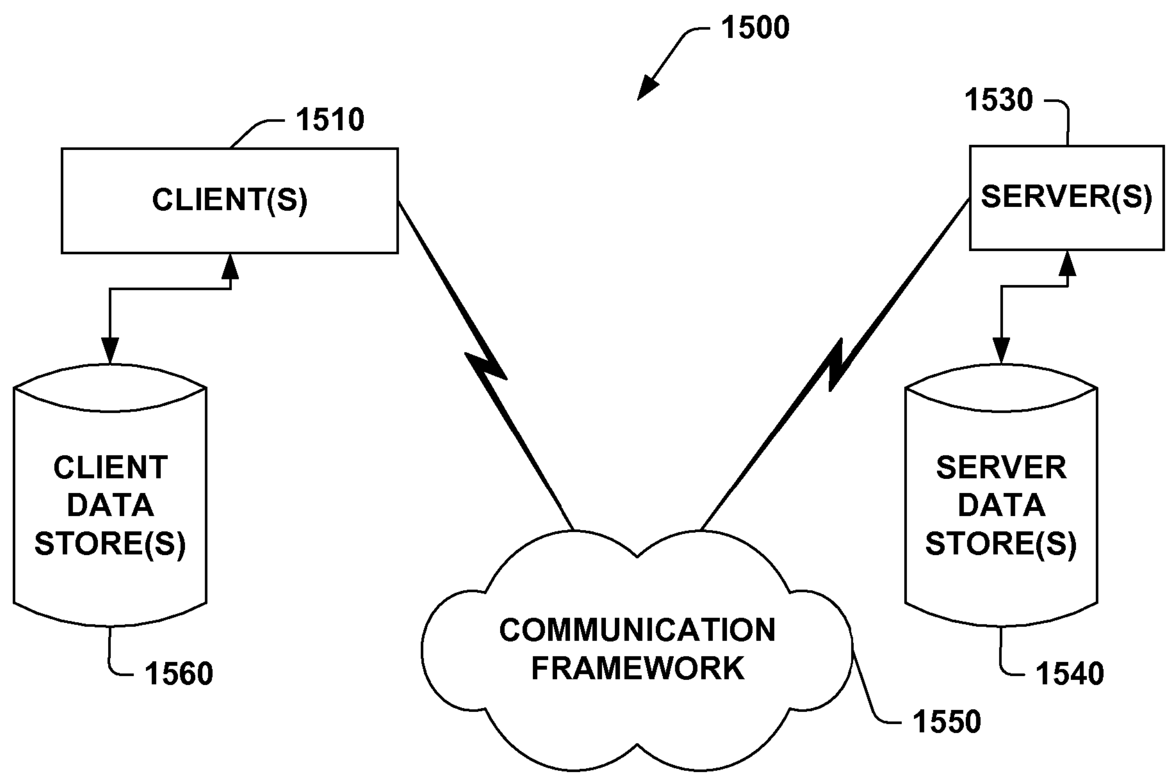
FIG. 15 is a schematic block diagram of an exemplary communication environment in accordance with the present invention.

FIG. 15 is a schematic block diagram of a sample computing environment 1500 with which the present invention can interact. The system 1500 includes one or more client(s) 15 10. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 15 10. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer storage media comprising computer executable instructions for a segmented layered image system comprising:

a pixel energy component adapted to calculate pixel energy for a region of a document image, the pixel energy component further adapted to calculate a partition of the region based at least in part upon minimization of pixel energy of at least one of a foreground and a background;

a region merge component that merges pairs of regions of the document image based, at least in part, upon minimization of pixel energy; and, a mask storage component adapted to store information associated with the partition in a mask.

2. One or more computer storage media of claim 1, the pixel energy component calculating energy variances utilizing the equations:

$$v_F = \sum_{x \in F} (f(x) - \mu_F)^2$$

$$v_B = \sum_{x \in B} (f(x) - \mu_B)^2$$

where F is the foreground, B is the background, f(x) is the value of the pixel, $$\mu_F = \frac{1}{N_F} \sum_{x \in F} f(x)$$

is the mean pixel value of the foreground, $$\mu_B = \frac{1}{N_B} \sum_{x \in B} f(x)$$

is the mean pixel value of the background, $N_F$ is the number of pixels in the foreground, and, $N_B$ is the number of pixels in the background for calculation of pixel energy variances of the region.

3. One or more computer storage media of claim 1, the pixel energy component calculating energy utilizing the equations:

$$v_F = \sum_{x,y \in F} (f(x, y) + A_F x + B_F y + C_F)^2$$

$$v_B = \sum_{x,y \in B} (f(x, y) + A_B x + B_B y + C_B)^2$$

where F is the foreground, B is the background, f(x, y) is the value of the pixel at location x, y , $A_F$, $B_F$, $C_F$ are chosen to minimize the energy of the foreground $v_F$, $A_B$, $B_B$,$C_B$ are chosen to minimize the energy of the background $v_B$, for calculation of pixel energy of the region.

4. One or more computer storage media of claim 1, the region merge component evaluating combinations of foregrounds and backgrounds of the two regions, and selecting the combination with a least cumulative energy.

5. One or more computer storage media of claim 1, the region merge component evaluating a subset of combinations of foregrounds and backgrounds of the two regions, based on an approximation f over the given regions, and selecting the combination with a least cumulative energy.

6. One or more computer storage media of claim 1, the document image comprising at least one of a YUV, RGB and binary representation of a document.

7. One or more computer storage media of claim 1, the mask being a binary representation of information associated with the partition of the foreground and the background.

8. One or more computer storage media of claim 1, the pixel energy component calculating pixel energy variances for a region utilizing at least in part a K-means clustering algorithm, where K=2.

9. One or more computer storage media of claim 1, the pixel energy component at least temporarily storing at least some of the information associated with calculating pixel energy.

10. One or more computer storage media of claim 1, the pixel energy component calculating pixel energy for the region based at least in part upon a polynomial regression of the region.

11. One or more computer storage media of claim 1, partitioning of the region being based at least in part upon an average of pixel values of the merged region.

12. One or more computer storage media of claim 11, a pixel value greater than the average being assigned to the foreground.

13. One or more computer storage media of claim 11, a pixel value greater than the average being assigned to the background.

14. A method for generating a mask partitioning a document image into a background and a foreground, comprising:

calculating pixel energy for a region;

partitioning the region based at least in part upon the calculated pixel energy of at least one of a foreground and a background of the region;

merging adjacent pairs of regions if a threshold energy associated with a new foreground and background would not be exceeded in the merged region;

partitioning the merged region into the new foreground and the new background based; and, storing the partitioning information in a mask.

15. The method of claim 14, calculating pixel energy for a region further comprising:

calculating a sum of pixel values for a foreground;

calculating a sum of pixel values for a background; and, calculating a sum of squares distances for substantially all of the pixels in the region.

16. The method of claim 14, partitioning the region further comprising minimizing pixel energy of at least one of a foreground and a background.

17. The method of claim 14, partitioning the merged region further comprising the following acts:

calculating an average pixel value of the foreground of the merged region;

calculating an average pixel value of the background of the merged region; and assigning pixels to one of the foreground and the background if the difference between the average pixel value of the foreground and the average pixel value of the background is greater than a third threshold.

18. The method of claim 14, partitioning the region further comprising the following acts:

calculating an energy for the region; and, assigning pixels of the region to one of the foreground and the background if the energy is less than a second threshold energy.

19. A mask separation component, comprising:

means for calculating pixel energy for a region of a representation of a document image;

means for calculating a partition of the region based at least in part upon minimization of energy of at least one of two planes;

means for merging pairs of regions of the representation of the document image based at least in part upon a determination of whether the regions to be merged would exceed a threshold energy;

means for partitioning pixels of regions into a foreground and a background based at least in part upon minimization of energy of pixels comprising at least one of the foreground and the background; and, means for storing information associated with the partition in a mask.

* * * * *